US010953484B2

(12) United States Patent
Pagano et al.

(10) Patent No.: US 10,953,484 B2
(45) Date of Patent: Mar. 23, 2021

(54) NARROW GROOVE WELDING METHOD AND SYSTEM

(71) Applicant: ILLINOIS TOOL WORKS INC., Glenview, IL (US)

(72) Inventors: Kevin Pagano, Algonquin, IL (US); Bryan Dustin Marschke, Golden, CO (US); Thomas Roger Jaeger, Tilbury (CA); Nauman Basit, Windsor (CA); Kenneth S. Dobson, Northville, MI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 875 days.

(21) Appl. No.: 14/481,624

(22) Filed: Sep. 9, 2014

(65) Prior Publication Data

US 2015/0076120 A1   Mar. 19, 2015

Related U.S. Application Data

(60) Provisional application No. 61/878,452, filed on Sep. 16, 2013.

(51) Int. Cl.
*B23K 9/073* (2006.01)
*B23K 9/29* (2006.01)
(Continued)

(52) U.S. Cl.
CPC ............ *B23K 9/073* (2013.01); *B23K 9/0213* (2013.01); *B23K 9/0216* (2013.01); *B23K 9/125* (2013.01); *B23K 9/173* (2013.01); *B23K 9/295* (2013.01)

(58) Field of Classification Search
CPC ........ B23K 9/09; B23K 9/095; B23K 9/0953; B23K 9/16; B23K 9/0213; B23K 9/0216;
(Continued)

(56) References Cited

U.S. PATENT DOCUMENTS

| 2,340,796 | A | * | 2/1944 | Chyle ...................... B23K 9/30 |
| | | | | 219/137 R |
| 3,072,779 | A | * | 1/1963 | Masters ............... B23K 9/1274 |
| | | | | 219/124.31 |

(Continued)

FOREIGN PATENT DOCUMENTS

| CN | 1212215 | 7/2005 |
| CN | 1665633 | 9/2005 |

(Continued)

OTHER PUBLICATIONS

International Search Report from PCT application No. PCT/US2014/055094, dated Apr. 30, 2015, 14 pgs.
(Continued)

*Primary Examiner* — Qingzhang Zhou
*Assistant Examiner* — Christopher R Dandridge
(74) *Attorney, Agent, or Firm* — McAndrews, Held & Malloy, Ltd.

(57) ABSTRACT

A system includes a welding torch assembly configured to establish a welding arc between an electrode and workpieces separated by a narrow groove utilizing power from a power supply while moving the electrode radially in a desired pattern by a motion control assembly within the welding torch assembly. The welding torch assembly includes a nozzle through which the electrode is fed and within which the electrode is radially moved.

19 Claims, 8 Drawing Sheets

(51) Int. Cl.
*B23K 9/02* (2006.01)
*B23K 9/12* (2006.01)
*B23K 9/173* (2006.01)

(58) Field of Classification Search
CPC ........ B23K 9/073; B23K 9/125; B23K 9/173; B23K 9/295; B23K 9/29; B23K 9/291; B23K 9/325
USPC .............................. 219/125.12, 126, 124.31
See application file for complete search history.

(56) References Cited

U.S. PATENT DOCUMENTS

| | | | |
|---|---|---|---|
| 3,172,992 A * | 3/1965 | Keller | B23K 9/123 219/137.31 |
| 3,818,176 A | 6/1974 | Brown | |
| 4,010,346 A * | 3/1977 | Cecil | B23K 9/1274 219/124.34 |
| 4,356,378 A | 10/1982 | Cloos | |
| 4,441,011 A | 4/1984 | Nomura | |
| 4,621,185 A | 11/1986 | Brown | |
| 4,631,386 A * | 12/1986 | Slavens | B23K 9/0282 219/124.31 |
| 4,704,513 A | 11/1987 | Sugitani | |
| 4,717,807 A | 1/1988 | Parks | |
| 4,835,360 A | 5/1989 | Parks | |
| 4,897,523 A | 1/1990 | Parks | |
| 4,954,691 A | 9/1990 | Parks | |
| 4,999,478 A | 3/1991 | Bushey | |
| 5,030,812 A | 7/1991 | Sugitani | |
| 5,040,125 A | 8/1991 | Okumura | |
| 5,864,115 A | 1/1999 | Ikeda | |
| 5,938,955 A | 8/1999 | Ikeda | |
| 5,961,863 A | 10/1999 | Stava | |
| 5,981,906 A | 11/1999 | Parker | |
| 6,002,104 A | 12/1999 | Hsu | |
| 6,051,810 A | 4/2000 | Stava | |
| 6,093,906 A | 7/2000 | Nicholson | |
| 6,172,333 B1 | 1/2001 | Stava | |
| 6,204,478 B1 | 3/2001 | Nicholson | |
| 6,215,100 B1 | 4/2001 | Stava | |
| 6,267,291 B1 | 7/2001 | Blankenship | |
| 6,441,342 B1 | 8/2002 | Hsu | |
| 6,501,049 B2 | 12/2002 | Stava | |
| 6,510,984 B2 | 1/2003 | Blankenship | |
| 6,536,660 B2 | 3/2003 | Blankenship | |
| 6,708,877 B2 | 3/2004 | Blankenship | |
| 6,723,954 B2 | 4/2004 | Nikodym | |
| 6,730,875 B2 | 5/2004 | Hsu | |
| 6,909,066 B2 | 6/2005 | Zheng | |
| 6,942,139 B2 | 9/2005 | Lipnevicius | |
| 7,032,814 B2 | 4/2006 | Blankenship | |
| 7,067,767 B2 | 6/2006 | Hsu | |
| 7,087,860 B2 | 8/2006 | Nikodym | |
| 7,109,439 B2 | 9/2006 | Stava | |
| 7,204,792 B2 * | 4/2007 | Hagihara | B23K 9/32 483/13 |
| 7,304,269 B2 | 12/2007 | Fulmer | |
| 7,397,015 B2 | 7/2008 | Peters | |
| 7,683,290 B2 | 3/2010 | Daniel | |
| 7,745,757 B2 * | 6/2010 | Enyedy | B23K 37/0282 219/124.31 |
| 7,863,538 B2 | 1/2011 | Barhorst | |
| 8,203,099 B2 | 6/2012 | Peters | |
| 8,283,598 B2 | 10/2012 | Fulmer | |
| 8,373,093 B2 | 2/2013 | Peters | |
| 8,410,398 B2 | 4/2013 | Daniel | |
| 8,445,816 B2 | 5/2013 | Cole | |
| 8,937,267 B2 | 1/2015 | Peters | |
| 9,511,442 B2 * | 12/2016 | Panelli | B23K 9/095 |
| 2003/0116548 A1 | 6/2003 | Blankenship | |
| 2004/0026396 A1 | 2/2004 | Nikodym | |
| 2005/0103766 A1 | 5/2005 | Iizuka | |
| 2005/0224480 A1 | 10/2005 | Lipnevicius | |
| 2008/0041834 A1 | 2/2008 | Nishimura | |
| 2008/0053978 A1 | 3/2008 | Peters | |
| 2008/0245774 A1 * | 10/2008 | Kim | B23K 26/0093 219/74 |
| 2009/0045172 A1 | 2/2009 | VanErk | |
| 2009/0321402 A1 | 12/2009 | Doyle | |
| 2010/0176104 A1 | 7/2010 | Peters | |
| 2010/0301029 A1 | 12/2010 | Meckler | |
| 2011/0155710 A1 | 6/2011 | Farah | |
| 2011/0297658 A1 | 8/2011 | Peters | |
| 2012/0061364 A1 | 3/2012 | Purslow | |
| 2012/0097655 A1 | 4/2012 | Daniel | |
| 2012/0097656 A1 | 4/2012 | Peters | |
| 2012/0152920 A1 | 6/2012 | Enyedy | |
| 2012/0152921 A1 | 6/2012 | Peters | |
| 2013/0001210 A1 | 1/2013 | Pagano | |
| 2013/0015170 A1 | 1/2013 | Peters | |
| 2013/0043219 A1 | 2/2013 | Peters et al. | |
| 2013/0048619 A1 | 2/2013 | Doyle | |
| 2013/0092667 A1 | 4/2013 | Peters | |
| 2013/0112675 A1 | 5/2013 | Peters | |
| 2013/0146575 A1 * | 6/2013 | Hillen | B23K 9/125 219/137.71 |
| 2013/0153557 A1 | 6/2013 | Pagano | |
| 2013/0175247 A1 | 7/2013 | Peters | |
| 2013/0193124 A1 | 8/2013 | Peters | |
| 2013/0213948 A1 | 8/2013 | Peters | |
| 2013/0228555 A1 | 9/2013 | Peters | |
| 2013/0264323 A1 | 10/2013 | Daniel | |
| 2014/0027422 A1 | 1/2014 | Panelli | |
| 2015/0076119 A1 | 3/2015 | Hsu | |
| 2015/0076120 A1 | 3/2015 | Pagano | |

FOREIGN PATENT DOCUMENTS

| | | | |
|---|---|---|---|
| CN | 101655705 | 2/2010 | |
| CN | 102581436 | 7/2012 | |
| CN | 202894634 | * 2/2013 | ............. B23K 37/02 |
| DE | 4315780 | 11/1994 | |
| EP | 0076498 | 4/1983 | |
| EP | 0278620 | 8/1988 | |
| EP | 0402648 | 12/1990 | |
| EP | 0824985 | 2/1998 | |
| EP | 1710043 | 10/2006 | |
| EP | 1733838 | 12/2006 | |
| JP | S58107271 | 6/1983 | |
| JP | S59101280 | 6/1984 | |
| JP | S644875 | 1/1989 | |
| JP | S1071580 | 3/1989 | |
| JP | H0191965 | 4/1989 | |
| JP | H0191966 | 4/1989 | |
| JP | 3018474 | 1/1991 | |
| JP | 4187380 | 7/1992 | |
| JP | 4200866 | 7/1992 | |
| JP | 0523856 | 2/1993 | |
| JP | H5023856 | 2/1993 | |
| JP | H2050023856 | 2/1993 | |
| JP | H05309476 | 11/1993 | |
| JP | H6122074 | 5/1994 | |
| JP | 0866771 | 3/1996 | |
| JP | H0866771 | 3/1996 | |
| JP | 9094658 | 4/1997 | |
| JP | H0994658 | 4/1997 | |
| JP | 09-094658 | * 8/1997 | ............. B23K 9/022 |
| JP | H09300072 | 11/1997 | |
| JP | 106004 | 1/1998 | |
| JP | H106004 | 1/1998 | |
| JP | 10052754 | 2/1998 | |
| JP | H11239878 | 9/1999 | |
| JP | 2000158132 | 6/2000 | |
| JP | 2000301332 | 10/2000 | |
| JP | 2001259838 | 9/2001 | |
| JP | 2002239733 | 8/2002 | |
| JP | 2002316264 | 10/2002 | |
| JP | 2006159246 | 6/2006 | |
| JP | 2010253533 | 11/2010 | |
| SU | 1106619 | 8/1984 | |

(56) References Cited

FOREIGN PATENT DOCUMENTS

| SU | 1593831 | 9/1990 |
|---|---|---|
| WO | 2012076750 | 6/2012 |
| WO | 2013045214 | 4/2013 |

OTHER PUBLICATIONS

International Search Report from PCT application No. PCT/US2014/055090, dated Dec. 18, 2014, 9 pgs.
Steve Barhorst: "Metal cored electrode basics", The American Welder, Dec. 31, 2000 (Dec. 31, 2000), p. 1, XP002685315, American Welding Society Retrieved from the Internet: URL:http://www.aws.org/wj/amwelder/11-00/barhorst.html [retrieved on Oct. 16, 2012].
International Search Report from PCT application No. PCT/US2012/044466 dated Nov. 5, 2012, 11 pgs.
Iwata, Shinji, Murayama, Masatoshi, and Kojima, Yuji; "Application of Narrow Gap Welding Process with High Speed Rotating Arc to Box Column Joints of Heavy Thick Plates," JFE Technical Report, No. 14, Dec. 2009, pp. 16-21.
Sugitani, Y, Kobayashi, Y, and Murayama, M, "Development and application of automatic high speed rotation and arc welding," Welding International, 5 (7), pp. 577-583, 1991.
International Search Report from PCT application No. PCT/US2012/069378 dated Apr. 2, 2013, 15 pgs.
International Search Report from PCT application No. PCT/US2013/052356 dated Dec. 2, 2013, 15 pgs.
Korean Office Action Appln. No. 10-2014-7019335 dated Oct. 17, 2018.

\* cited by examiner

NARROW GROOVE WELDING METHOD AND SYSTEM

CROSS-REFERENCE TO RELATED APPLICATIONS

This application claims priority from and the benefit of U.S. Provisional Application Ser. No. 61/878,452, entitled "NARROW GROOVE WELDING METHOD AND SYSTEM," filed Sep. 16, 2013, which is hereby incorporated by reference in its entirety for all purposes.

BACKGROUND

The invention relates generally to welding and, more particularly, to systems and methods for welding in narrow grooves. The present disclosure is related to and incorporates previously filed U.S. patent application Ser. No. 13/767,392, entitled "Adaptable Rotating Arc Welding Method and System," filed on Feb. 14, 2013, previously filed U.S. patent application Ser. No. 13/526,278, entitled "Metal Cored Welding Method and System," filed on Jun. 18, 2012, previously filed U.S. patent application Ser. No. 13/681,687, entitled "DC Electrode Negative Rotating Arc Welding Method and System," filed on Nov. 20, 2012, and concurrently filed U.S. patent application Ser. No. 14/481,507, entitled "Synchronized Rotating Arc Welding Method and System," filed on Sep. 9, 2014.

A range of techniques have been developed for joining workpieces by welding operations. These include diverse processes and materials, with most modern processes involving arcs developed between a consumable or non-consumable electrode and the workpieces. The processes are often grouped in such categories as constant current processes, constant voltage processes, pulsed processes, and so forth. However, further divisions between these are common, particularly in processes that consume an electrode to add filler metal to the weld. In virtually all such cases, the process selected is highly linked to the filler material and its form, with certain processes exclusively utilizing a particular type of electrode. For example, certain types of metal inert gas (MIG) welding processes, which form part of a larger group sometimes referred to as gas metal arc welding (GMAW).

In GMAW welding, an electrode in the form of a wire is consumed by the progressing weld pool, melted by the heat of an arc between the electrode wire and the workpiece. The wire is continuously fed from a spool through welding gun where a charge is imparted to the wire to create the arc. The electrode configurations used in these processes are often referred to as either solid wire, flux cored wire, or metal cored wire. Each type is considered to have distinct advantages and disadvantages over the others, and careful adjustments to the welding process and weld settings may be required to optimize their performance. For example, solid wire, while less expensive than the other types, is typically used with inert shielding gases, which can be relatively expensive. Flux cored wires may not require separate shielding gas feeds, but are more expensive than solid wires. Metal cored wires do require shielding gas, but these may be adjusted to mixes that are sometimes less expensive than those required for solid wires.

All three of these electrode types may be used with different transfer modes, referring to the mechanical and electromechanical phenomena of moving metal from the electrode tip to the progressing weld bead. A number of such transfer modes exist, such as short circuit transfer, globular transfer, spray transfer, and pulsed spray transfer. In practice, transfer physics may appear as a hybrid of these, and the actual material transfer may transition between them during welding, although the process and electrode are often selected to maintain a certain transfer mode.

Manufacturers are constantly looking for new ways to improve automated welding methods, increase the success rate of the welded pieces, and speed up the manufacturing process overall. In particular, welding workpieces together when there is a relatively deep and narrow groove between the workpieces presents certain space constraints that are difficult to overcome even using automated welding methods.

BRIEF DESCRIPTION

In one embodiment, a system includes a welding torch assembly configured to establish a welding arc between an electrode and workpieces separated by a narrow groove utilizing power from a power supply while moving the electrode radially in a desired pattern by a motion control assembly within the welding torch assembly. The welding torch assembly includes a nozzle through which the electrode is fed and within which the electrode is radially moved.

In another embodiment, a system includes a welding torch assembly configured to establish a welding arc between an electrode and workpieces separated by a narrow groove utilizing power from a power supply while moving the electrode radially in a desired pattern by a motion control assembly within the welding torch assembly. The welding torch assembly comprises two separate shielding arms disposed on opposite sides of the electrode.

In another embodiment, a welding method includes establishing an arc between a welding electrode and workpieces separated by a narrow groove during a welding process. The welding method also includes feeding the electrode from a welding torch assembly while moving the electrode radially in a desired pattern by a motion control assembly within the welding torch assembly to establish a weld bead during the welding process. The welding method further includes altering a parameter of the welding process based at least in part on a position of the electrode within the narrow groove while maintaining the arc and weld bead.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The embodiments described herein relate to a welding system for welding workpieces together, wherein the groove between the workpieces is characterized by a relatively narrow and/or deep groove (collectively referred to herein as a "narrow groove") as compared to typical weld grooves. Certain embodiments described herein include a slim profile nozzle such that the sides of the nozzle are narrower, thereby facilitating the nozzle fitting within the narrow groove. In addition, in certain embodiments, the nozzle is retractable as the depth of the weld in the groove changes. The embodiments described herein also include a nozzle changing system such that one of a plurality of nozzles may be selected from the nozzle changing system based on the depth of the groove for a specific weld pass. For example, the weld process may begin at the bottom of the narrow groove and, as the groove is filled with deposited metal, a different nozzle may be selected to compensate for changing depth of the weld formed in the groove. In addition, in certain embodiments, tubing may be attached near the front and back (e.g., forward and aft) sides of the nozzle to deliver gas proximate the weld pool. In certain embodiments, the spin tube and contact tip may be protected with a non-conductive coating that can withstand high temperatures to prevent unintended incidental contact between the spin tube and the base metal.

Figures 1, 2:
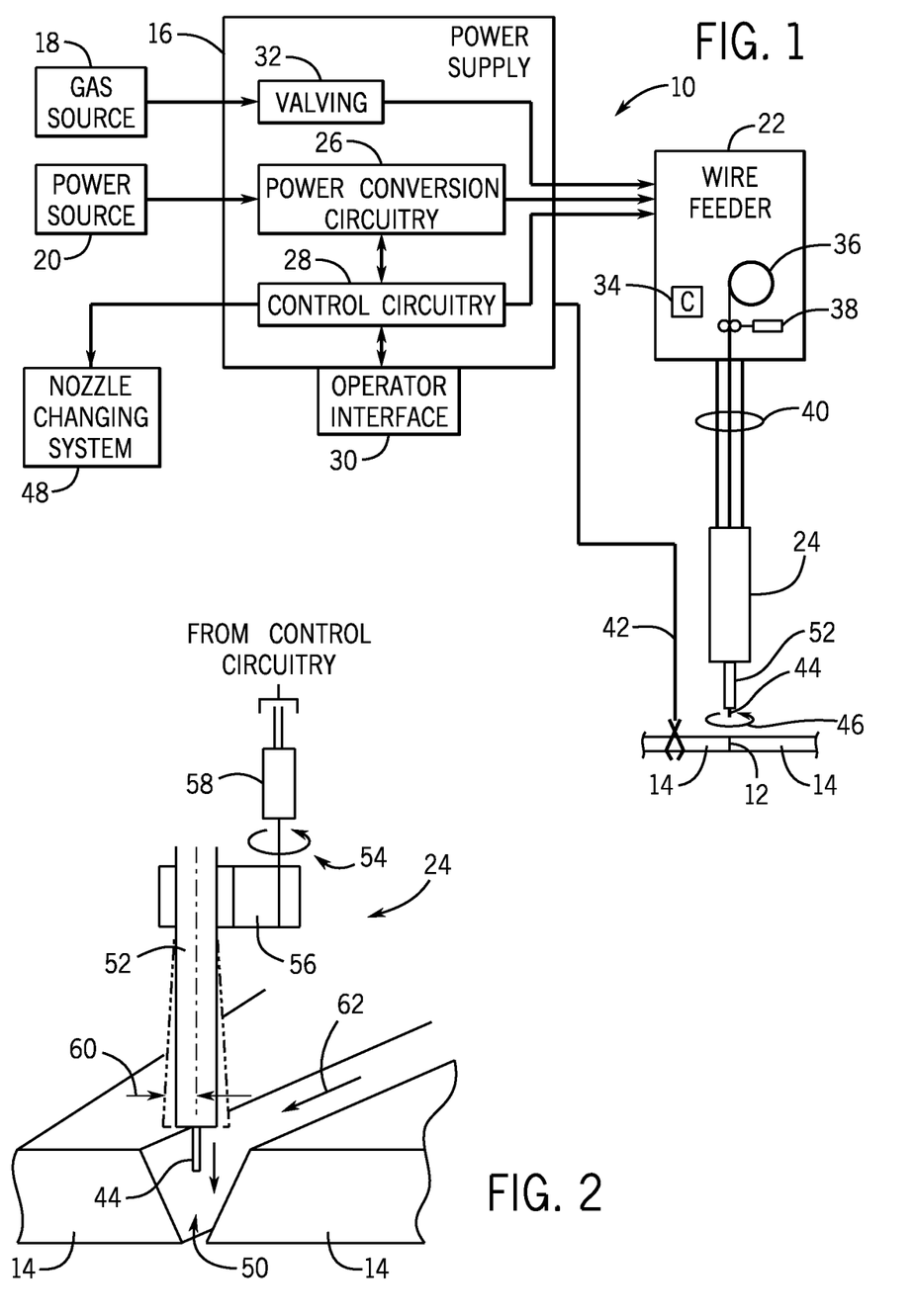
FIG. 1 is a diagrammatical representation of an exemplary welding system utilizing aspects of the present techniques.
FIG. 2 is a diagrammatical view representing movement of an electrode in accordance with aspects of the present techniques.

Turning now to the drawings, FIG. 1 illustrates an exemplary welding system 10 for producing a weld 12 in a narrow groove between workpieces 14. The system includes a power supply 16 that will typically be coupled to a gas source 18 and to a power source 20, such as the power grid. Other power sources, of course, include generators, engine-driven power packs, and so forth. A wire feeder 22 is coupled to the power supply 16 and supplies welding wire to a welding torch 24.

In the illustrated embodiment, the power supply 16 will include power conversion circuitry 26 coupled to control circuitry 28 that regulates operation of the power conversion circuitry 26 to produce power output suitable for the welding operation. The power supply 16 may be designed and programmed to produce output power in accordance with a number of processes, welding regimes, and so forth, including constant current processes, constant voltage processes, pulsed processes, short circuit transfer processes, and so forth. In a presently contemplated embodiment, the control circuitry 28 controls the power conversion circuitry 26 to produce a DCEN (sometimes referred to as a "straight" polarity) welding regime that aids in the transfer of material from the welding wire to a progressing weld bead. However, other welding regimes may of course be used. An operator interface 30 allows a welding operator to alter both the welding process and the process settings. Moreover, in certain contemplated embodiments, the operator interface 30 may allow selection modification of certain parameters related to movement of the welding torch 24 and the welding wire. Finally, the power supply 16 may include valving 32 for regulating the flow of shielding gas from the gas source 18.

The wire feeder 22 will typically include control circuitry, illustrated generally by reference numeral 34, which regulates the feed of welding wire from a spool 36, barrel, or other methods for delivering welding wire. The welding wire is advanced by a drive assembly 38, typically through the use of a small electric motor under the control of the control circuitry 34. Welding wire, gas, and control and feedback data may be exchanged between the wire feeder 22 and the welding torch 24 via a weld cable 40. The workpieces 14 are also coupled to the power supply 16 by a work cable 42 to complete an electrical circuit through the electrode 44 when an electric arc is established between the electrode 44 and the workpieces 14. As described more fully below, the electrode 44 advancing from the welding torch 24 is forced to move, such as in a rotary motion, as indicated by reference numeral 46.

The welding system 10 illustrated in FIG. 1 may be designed for manual operation, although many of the applications for the present techniques will be automated. That is, the welding torch 24 will be secured to a robot that is programmed to position the welding torch 24 at desired locations with respect to the workpieces 14. The robot may then act to initiate arcs between the electrode 44 and the workpieces 14, and properly orient the welding torch 24 and advance the welding torch 24 along a predefined path within the narrow groove between the workpieces 14, where a weld bead is to be established to join the two workpieces 14. As described more fully below, in such automation applications, the present techniques allow for greatly enhanced travel speeds and improved weld bead characteristics in narrow groove applications.

The present techniques are designed for use with solid wire, flux cored or metal cored welding wires. The characteristics of the welding wire (i.e., the electrode 44) may be selected for a particular application, particularly depending upon the metallurgy of the components to be joined, the type of shielding gas to be used, the anticipated fill volumes of the weld bead, and so forth. Certain geometries of the welding wire may assist in enhancing the benefits of the electrode movement. For example, the welding wire will typically be selected to have a desired diameter. In flux cored or metal cored welding wires, the diameter comprises a sheath wall thickness and a core diameter. These parameters may be altered and optimized to enhance the performance of the welding wire and to provide such characteristics as improved arc establishment, arc maintenance, material transfer, metallurgy of the resulting weld bead, weld bead penetration, and so forth.

In certain embodiments, specific wires may be selected for use with DCEN welding regimes. As discussed more fully below, for example, it has been found that the combination of "spin-arc" movement with DCEN processes and wires such as wires comprising stabilizers, and other components, such as manganese (e.g., AWS E5.18 70C-6; and more generally, E5.18 XXC-6, where "XX" denotes tensile strength) provide excellent results. One such wire is commercially available under the name Metalloy® X-Cel™ from Hobart Brothers of Troy, Ohio. Still further, certain formulations of welding wire are believed to provide benefits beyond those obtainable with other wires. Such formulations are described in U.S. Pat. No. 6,723,954, entitled Straight Polarity Metal Cored Wire, issued to Nikodym et al. on Apr. 20, 2004; U.S. Pat. No. 7,087,860, entitled Straight Polarity Metal Cored Wire, issued to Nikodym et al. on Aug. 8, 2006; and U.S. Pat. No. 7,863,538, entitled Metal-Core Gas Metal Arc Welding of Ferrous Steels with Noble Gas Shielding, issued to Barhorst et al. on Jan. 4, 2011, which are all hereby incorporated into the present disclosure by reference. Moreover, certain composition modifications may be made to such wires to enhance their performance in DCEN processes with forced movement of the arc, as discussed below.

As described in greater detail below, the welding system 10 may also include a nozzle changing system 48, which may be used to selectively interchange nozzles of the welding torch 24 based on current operational parameters of the welding system 10, such as current depth of the weld 12 being formed in the narrow groove. It will be appreciated that the nozzle changing system 48 may be controlled by the control circuitry 28 of the power supply 16 in certain embodiments. In other words, the control circuitry 28 may determine that the current nozzle being used in the welding torch 24 should be changed based on input received from an operator via the operator interface 30, based on a timed schedule programmed into the control circuitry 28, and so forth.

As shown in FIG. 2, a joint is to be formed between the workpieces 14, and the welding torch 24 with the electrode 44 extending from it is positioned in close vicinity to the weld groove 50. An arc is then established between the electrode 44 and the underlying metal to be joined. The electrode 44 emanates from a contact element 52 (e.g., which may include a spin tube and a contact tip) that can be moved to force motion of the electrode 44 and the established arc. For movement of the contact element 52, a motion control assembly 54 is provided in the welding torch 24. Although numerous techniques may be utilized for forcing such motions, in a presently contemplated arrangement, a cam 56 is turned by a motor 58 which itself is controlled and powered by the control circuitry 28 of the welding system 10. The contact element 52 and electrode 44 are thus forced to move in a predefined pattern and at a predefined frequency as determined by the geometry and control of the motion control assembly 54. As illustrated in FIG. 2, the contact element 52, and thus the electrode 44, may be moved a predetermined distance or radius 60 from the center line of the contact element 52. As described below, various patterns may be utilized for this motion. The electrode 44 is advanced during this process to form the desired weld bead. Moreover, the entire assembly is moved at a desired travel speed, as indicated by reference numeral 62.

Figure 3A:
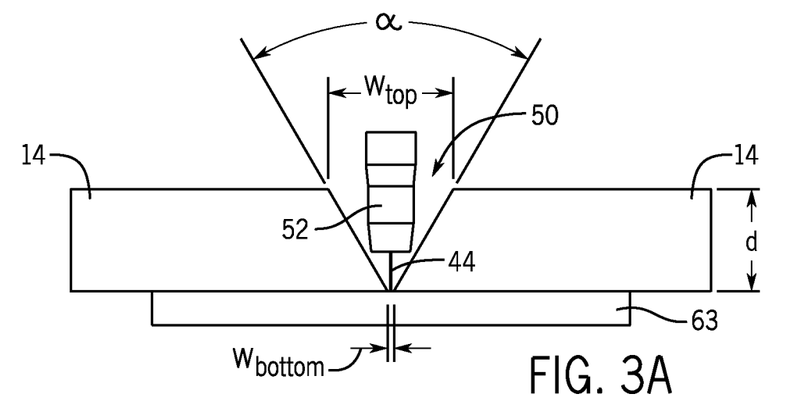
FIG. 3A is a side view of a typical groove between two workpieces to be welded together.
Figure 3B:
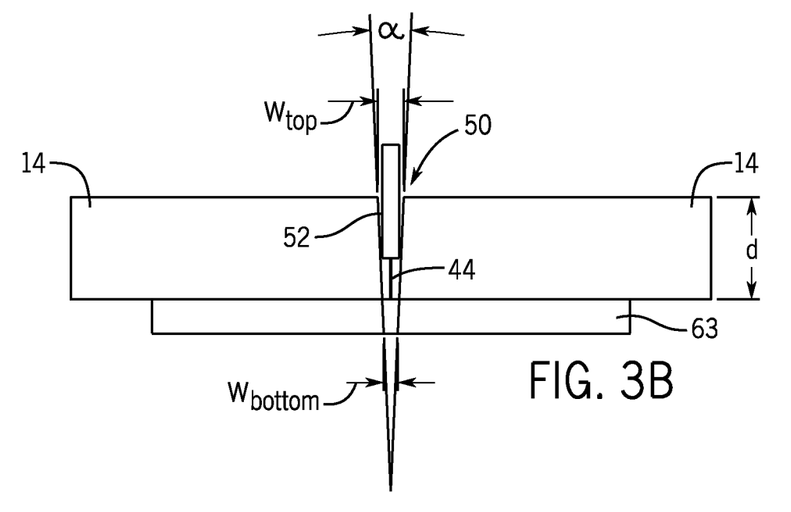
FIG. 3B is a side view of a narrow groove between two workpieces to be welded together in accordance with aspects of the present techniques.

FIGS. 3A and 3B illustrate the differences between typical weld grooves 50 (FIG. 3A) and the narrow weld grooves 50 (FIG. 3B) described herein. As illustrated in FIG. 3A, typical weld grooves may be characterized by a relatively small width $w_{bottom}$ between the workpieces 14 at the bottom of the workpieces 14, and a relatively large width $w_{top}$ between the workpieces 14 at the top of the workpieces 14. For example, in certain embodiments, the width $w_{top}$ between the workpieces 14 at the top of the workpieces 14 may be on the order of 10-30 times larger than the width $w_{bottom}$ between the workpieces 14 at the bottom of the workpieces 14, which may lead to an angle α of the groove between approximately 25 and approximately 90°.

In contrast, as illustrated in FIG. 3B, narrow weld grooves may be characterized by relatively similar widths $w_{top}$ and $w_{bottom}$ between the workpieces 14 at the top and bottom of the workpieces 14, respectively. For example, in certain embodiments, the width $w_{top}$ between the workpieces 14 at the top of the workpieces 14 may only be approximately 10-75% larger than the width $w_{bottom}$ between the workpieces 14 at the bottom of the workpieces 14, which may lead to a much lower angle α of the narrow groove of approximately 10°-approximately 25°, approximately 1°-approximately 10°, approximately 0°-approximately 5°, approximately 0°-approximately 2.5°, or even lower. Indeed, in certain embodiments, the width $w_{top}$ between the workpieces 14 at the top of the workpieces 14 may be substantially similar (e.g., within 0-5%) to the width $w_{bottom}$ between the workpieces 14 at the bottom of the workpieces 14, which may lead to an angle α of the narrow groove of approximately 0° (e.g., less than approximately 1°, less than approximately 0.5°, and so forth). It will be appreciated that other, less narrow, angles α (e.g., approximately 35°-approximately 45°) may benefit from the embodiments described herein.

As illustrated in FIGS. 3A and 3B, a backing plate 63 may be used both with typical weld grooves (FIG. 3A) and with narrow weld grooves (FIG. 3B). However, the use of a backing plate 63 may be even more advantageous with narrow weld grooves insofar as there is quite often at least some width $w_{bottom}$ between the workpieces 14 at the bottom of the workpieces 14 because of the reduced angle α of the narrow weld groove. In other words, the reduced angle α of the narrow weld groove, in addition to the need to have the welding torch 24 positioned within the narrow groove, often necessitates at least some width $w_{bottom}$ between the workpieces 14 at the bottom of the workpieces 14.

Figure 4:
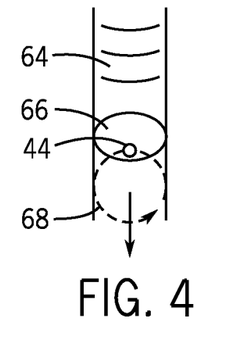
FIG. 4 is a top view of a progressing weld bead utilizing a circular pattern for movement of a welding wire electrode in accordance with aspects of the present techniques.

FIG. 4 illustrates an exemplary progressing weld bead 64 along with certain patterns of motion of the electrode 44. As will be appreciated by those skilled in the art, the weld bead progresses behind a weld pool or puddle 66 comprised of molten metal resulting from heating of the electrode 44 and surrounding metal of the base materials of the workpieces 14. The electrode 44 in the illustration of FIG. 4 is moved in a generally circular pattern as indicated by reference numeral 68. It is presently contemplated that such motion may be coordinated with the travel speed of the welding torch 24 such that the electrode 44 will be sufficiently close to the weld puddle 66 and peripheral regions of the workpieces 14 to maintain the arc and to move the arc between these regions, maintaining the weld puddle while heating the electrode 44 and surrounding metal. As described below, it is also contemplated that other coordinating factors may be employed, such as wire feed speeds, rates or frequencies of movement of the electrode 44, pulse frequencies or DC parameters for the welding process (e.g., currents and voltages applied to create the arc), and so forth.

Figure 5:
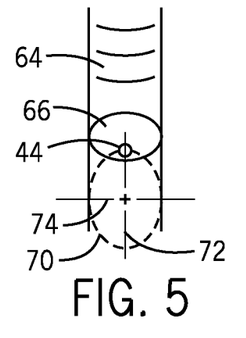
FIG. 5 is a similar top view of a progressing weld bead utilizing an elliptical path for a welding wire electrode in accordance with aspects of the present techniques.
Figure 6:
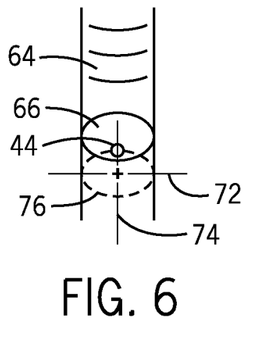
FIG. 6 is a further top view of a progressing weld bead utilizing a differently oriented elliptical path for a welding wire electrode in accordance with aspects of the present techniques.

FIG. 5 illustrates a further possible pattern for movement of the electrode 44, in this case a generally elliptical pattern 70. The ellipse in this case has a major axis 72 along the direction of travel of the weld and welding torch 24 and a minor axis 74 transverse to the direction of travel. Moreover, FIG. 6 illustrates a further possible pattern, namely a transverse elliptical pattern 76 in which a major axis 72 of the elliptical movement is transverse to the direction of travel of the weld and welding torch 24. It should be noted, however, any desired pattern may be utilized, and the motion control assembly 54 may be adapted to implement these patterns, among others. For example, patterns defining zigzags, figure 8's, transverse reciprocating lines, and so forth may be used and optimized for particular welds.

Parameters that may be varied in the technique may include factors such as the rate of movement of the electrode 44, and the degree of movement of the electrode 44 about a normal or central position. In particular, while the invention is certainly not limited to a circular pattern, where circular patterns have been used, it is believed that rates of rotation higher than 50 Hz, and extending to 100-120 Hz and higher may be desirable, obtaining flatter weld beads and higher deposition rates. In some embodiments, the electrode 44 may move (e.g., spin) circumferentially while moving radially (e.g., in circular pattern). Molten balls transferred from the moving electrode 44 may have a tangential velocity due to the radial electrode movement that causes the balls to interface with the workpieces 14 at positions other than directly below where the ball detaches from the electrode 44. As described herein, the rate of radial movement of the electrode 44 may be controlled so that the balls are deposited at desired locations on the workpieces 14, the joint, and/or the weld pool. For rates of radial movement less than approximately 150 Hz, the centripetal force on the balls from the radial movement may enable substantially consistent control of the deposition location of the balls.

In general, the rate of radial movement of the electrode 44 may be greater than approximately 2.5 Hz, greater than approximately 3.0 Hz, greater than approximately 3.5 Hz, greater than approximately 4.0 Hz, greater than approximately 4.5 Hz, or greater than approximately 5.0 Hz. In some embodiments, the rate of radial movement of the electrode 44 may be between approximately 5 to 200 Hz, approximately 10 to 150 Hz, approximately 30 to 100 Hz, or approximately 50 to 90 Hz. The rate of radial movement may be based at least in part on a shielding gas, the wire diameter, the wire material, the workpiece material, the welding process, the movement pattern, or the surface tension of the molten electrode ball, or any combination thereof. The range of radial movement rates may correspond to certain types of transfer processes and/or movement patterns. For example, the radial movement rate for SAW welding processes may be less (e.g., 5 Hz to 30 Hz) than MIG welding processes, which may be utilized with radial movement rates between approximately 50 Hz to 100 Hz. In some embodiments, a figure-8 or a circular movement pattern may have a lower radial movement rate than a zigzag movement pattern. Moreover, diameters of rotation are presently contemplated on the order of approximately 1.0 to 1.5 mm, but higher diameters, such as on the order of approximately 4.0 mm may be desired. These various parameters may assist in the penetration into the base materials, the deposition of the electrode material, the maintenance of the arc, as well as other welding parameters.

It is also believed that the weld puddle may move better with movement of the electrode 44, possibly due to mechanical forces (e.g., centrifugal forces) imparted on the molten ball or spray that develops at the electrode tip. The process may thus be able to run cooler than previous processes. Enhanced benefits may be offered as well on certain types of workpieces 14 and workpiece metallurgies. Furthermore, the process may allow for less expensive shielding gasses, such as $CO_2$ rather than argon mixes are currently used with such welding electrodes. As discussed earlier, sold wires, metal cored wires, and flux cored wires may be used with the present techniques as well and may each bring their own advantages to the process.

Because of the relatively deep and narrow nature of the narrow grooves described herein, multiple weld passes may be required to fill the groove 50 between the workpieces 14. The illustrations of the progressing weld beads illustrated in FIGS. 4-6 are examples of a single pass of filling the groove 50 between the workpieces 14. Once a single pass has been completed, a second pass may be performed on top of the first pass, and so on, until the narrow groove 50 has been completely filled. In certain embodiments, each pass may be performed in the same direction. However, in other embodiments, each subsequent pass may begin at the end of the narrow groove 50 where the last pass finished.

Figure 7:
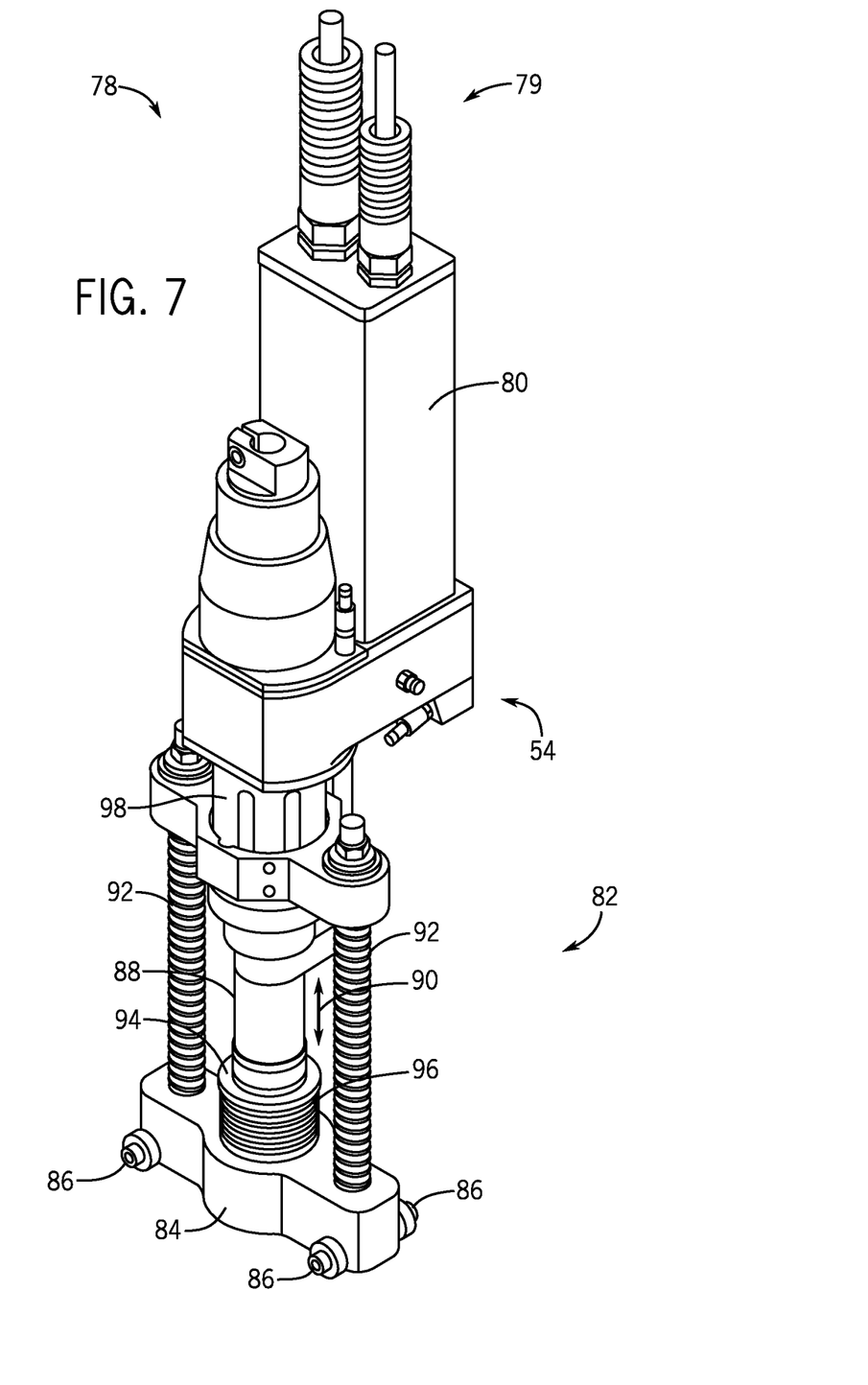
FIG. 7 is a perspective view of a welding torch assembly in accordance with aspects of the present techniques.

FIG. 7 is a perspective view of an exemplary welding torch assembly 78 for implementing the welding wire electrode delivery techniques described herein. In particular, the welding torch assembly 78 includes the motion control assembly 54 described above with respect to FIG. 2. A plurality of motor cables 79 are received into a main housing 80 of the welding torch assembly 78. These motor cables 79 may, for example, include a first cable for a motor drive of the motion control assembly 54 and a second cable for an encoder. The welding wire, gas, and control and feedback data are received separately by the welding torch assembly 78 via a separate cable (not shown). As described above, the motion control assembly 54, which is disposed in the main housing 80, may include a cam 56 (e.g., illustrated in FIG. 2) or other mechanisms for implementing the oscillating nature of the delivered welding wire electrode 44.

In certain embodiments, the welding torch assembly 78 also includes a trolley system 82 that facilitates alignment of the welding torch 24 within the narrow groove 50. As illustrated, the trolley system 82 includes a trolley 84 having a plurality of wheels 86 that interface with top surfaces of the workpieces 14 to be welded together. A cylindrical welding torch body 88, through which the contact element 52 extends, is insertable and retractable into and out of a mating cylindrical aperture through the trolley 84, as illustrated by arrows 90, to facilitate insertion and extraction of a nozzle of the welding torch assembly 78 into and out of the narrow groove 50. As illustrated in FIG. 7, in certain embodiments, a pair of gas delivery tubes 92 may be disposed on opposite sides of the welding torch body 88 for delivering shielding gas to the trolley 84. As illustrated, in certain embodiments, the gas delivery tubes 92 may include springs to keep the trolley 84 in contact with the workpieces 14. A nozzle collar 94 surrounds the nozzle to keep shielding gas from escaping while the trolley 84 is fully extended. When the torch is fully retracted, as the nozzle is in the narrow groove 50, the collar 94 retracts up the welding torch body 88. A nozzle collar spring 96, compresses as the trolley 84 fully retracts, to allow for the largest possible travel distance along arrows 90.

Figure 8:
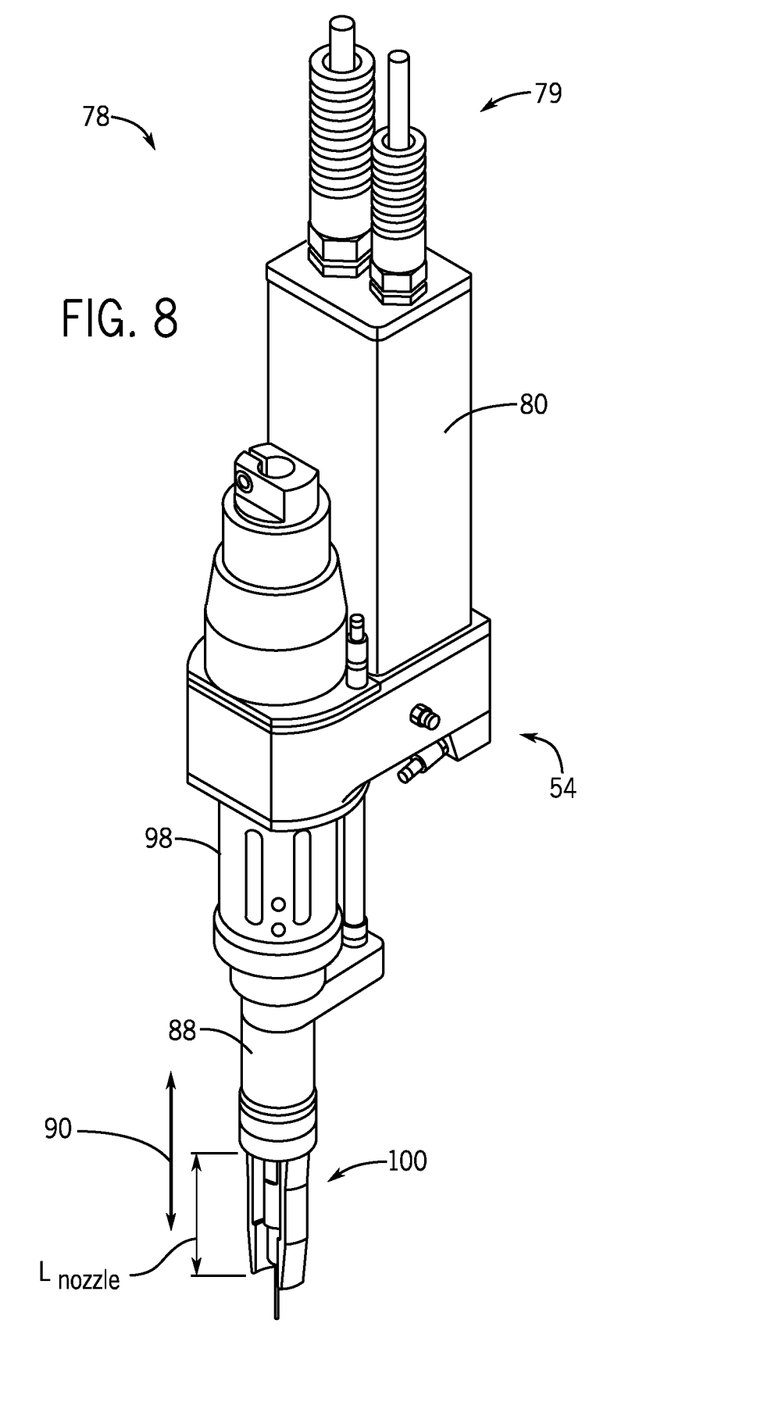
FIG. 8 is a perspective view of the welding torch assembly of FIG. 7 with a trolley system removed to facilitate illustration of a welding torch body.

FIG. 8 is a perspective view of the welding torch assembly 78 of FIG. 7 with the trolley system 82 removed to facilitate illustration of the welding torch body 88. As described above, the cylindrical welding torch body 88 may be moveable along its axis, as illustrated by arrows 90 to facilitate insertion and extraction of a nozzle 100 (as well as the contact element 52) of the welding torch assembly 78 into and out of the narrow groove 50. It will be appreciated that the control circuitry 28 discussed above with respect to FIG. 1 is configured to control actuation of the welding torch body 88 in an axial direction along arrows 90.

Figures 9A, 9B:
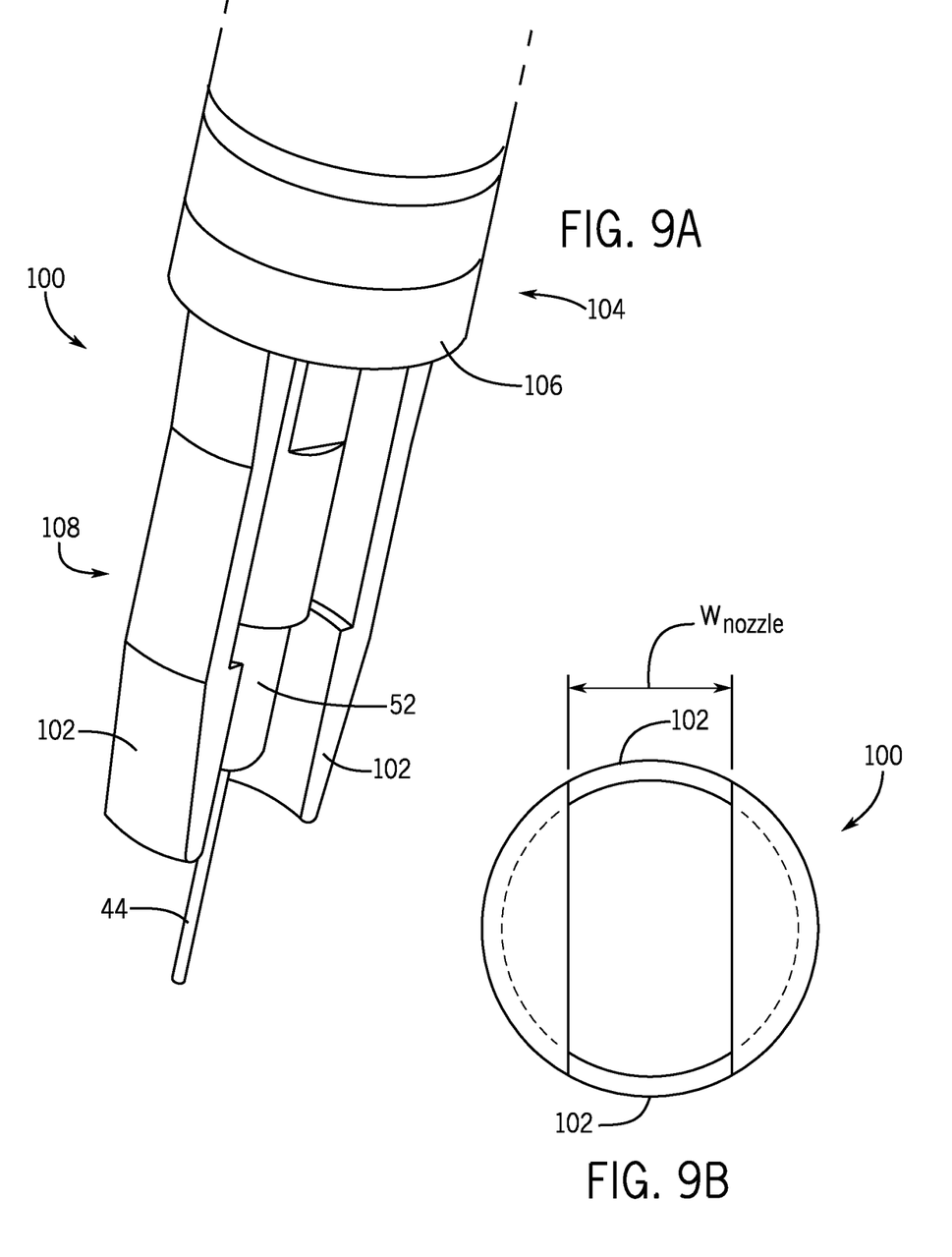
FIG. 9A is a perspective view of a nozzle and a contact element of the welding torch assembly in accordance with aspects of the present techniques.
FIG. 9B is a cross-sectional view of a lower portion of the nozzle to illustrate differences from conventional welding torch nozzles.

FIG. 9A is a perspective view of the nozzle 100 and the contact element 52 of the welding torch assembly 78. To facilitate welding within the narrow groove 50 between the workpieces 14 to be joined, as opposed to conventional welding gun nozzles that include a substantially symmetrical cylindrical wall within which the contact element 52 is disposed, the nozzle 100 of the welding torch assembly 78 instead includes two opposing nozzle wall sections 102 that are disposed on opposite sides of the contact element 52. More specifically, the nozzle 100 includes an upper portion 104 that includes a fully cylindrical wall 106, and a lower portion 108 that includes the two opposing wall sections 102 extending from the cylindrical wall 106. In essence, opposing sides of the nozzle 100 (i.e., wall sections that would connect the two opposing wall sections 102 to form a full cylindrical wall) have been removed in the lower portion 108 of the nozzle 100 to facilitate insertion and extraction of the nozzle 100 into and out of the narrow groove 50. In certain embodiments, the two opposing wall sections 102 may be generally arcuate or rounded. However, in other embodiments, the two opposing wall sections 102 may be shaped otherwise.

FIG. 9B illustrates a cross-sectional view of the lower portion 108 of the nozzle 100 to illustrate differences from conventional welding torch nozzles. In particular, as illustrated, the two opposing wall sections 102 of the lower portion 108 of the nozzle 100 are essentially carved out of what would be a conventional weld gun nozzle. As such, as illustrated in FIG. 9A, the contact element 52 is exposed on lateral sides between the two opposing wall sections 102.

Figure 10:
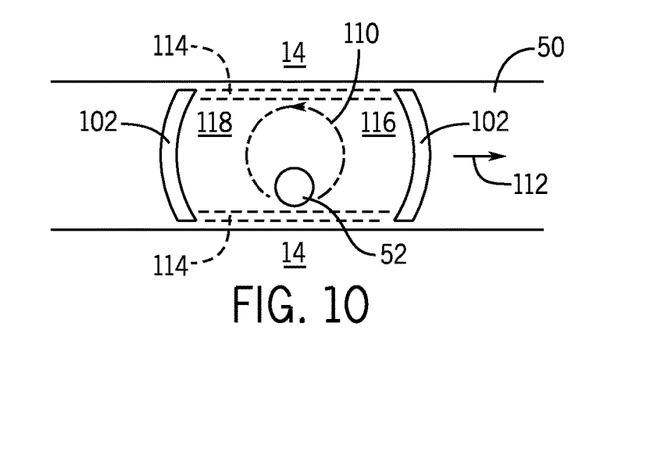
FIG. 10 is a top cross-sectional view of the lower portion of the nozzle and the contact element when inserted within the narrow groove in accordance with aspects of the present techniques.

FIG. 10 is a top cross-sectional view of the lower portion 108 of the nozzle 100 and the contact element 52 when inserted within the narrow groove 50. As illustrated, the contact element 52 and, thus, the welding wire electrode 44 are oscillated in a generally circular pattern, as illustrated by arrow 110, as the weld progresses in the direction of arrow 112. However, as described herein, other patterns of oscillation may be used as well. As will be appreciated, removing certain wall sections that would otherwise exist between the two opposing wall sections 102 of the nozzle 100 affords the contact element 52 more room for oscillation within the narrow groove 50. As illustrated in FIG. 10, the opposing wall sections 102 substantially isolate the weld area so that external air is blocked from the weld area. In addition, the oscillation of the contact element 52 and, thus, the welding wire electrode 44 occurs without contacting the opposing wall sections 102. More specifically, the distance between the opposing wall sections 102 is selected such that the maximum diameter of oscillation does not cause the contact element 52 to contact either of the opposing wall sections 102. The oscillating movement of the contact element 52 and, thus, the welding wire electrode 44 enhances penetration of the weld into the walls of the workpieces 14, thereby enhancing the strength of the weld.

In certain embodiments, as illustrated in FIG. 10, the two opposing wall sections 102 may actually be joined by thin connecting walls 114 within which the contact element 52 and welding wire electrode 44 oscillate. For example, a first thin connecting wall 114 may connect the two opposing wall sections 102 at first ends of the opposing wall sections 102, and a second thin connecting wall 114 may connect the two opposing wall sections 102 at second ends of the opposing wall sections 102, as illustrated in FIG. 10. In other embodiments, the thin connecting walls 114 may be extractable from the narrow groove 50 separate from the nozzle 100. In such embodiments, the thin connecting walls 114 may be used only when desired. In embodiments where the thin connecting walls 114 are extractable separate from the nozzle 100, the thin connecting walls 114 may be made of a ceramic material or a plastic material. In certain embodiments, the thin connecting walls 114 may be generally straight and generally parallel to each other. As described above, the narrow groove 50 between the workpieces 14 is relatively narrow and deep. As such, the nozzle 100 of the welding torch assembly 78, and particularly the lower portion 108 of the nozzle 100, may be similarly long and narrow to facilitate welding in the narrow groove 50.

Figure 11A:
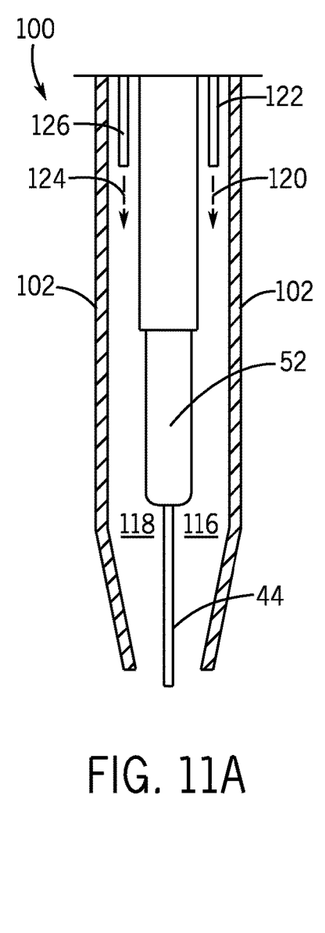
FIG. 11A is a side view of the contact element and the lower portion of the nozzle having gas delivery tubes disposed between wall sections of the nozzle and the contact element in accordance with aspects of the present techniques.

In addition, in certain embodiments, shielding gas may be delivered through the upper portion 104 of the nozzle 100 into both a forward cavity 116 between the forward wall section 102 and the contact element 52 and an aft cavity 118 between the aft wall section 102 and the contact element 52. In particular, as illustrated in FIG. 11A, a first flow of gas 120 may be injected into the forward cavity 116 via a first gas delivery tube 122 and a second, separate flow of gas 124 may be injected into the aft cavity 118 via a second gas delivery tube 126. In certain embodiments, the mixture of gas, flow rate of gas, and so forth, of the first and second gas flows 102, 124 may be different from each other. For example, in certain embodiments, the first gas flow 120 may contain more or less argon than the second gas flow 124, the first gas flow rate may be greater than or less than the second gas flow rate, and so forth. In addition, in certain embodiments, the gas may be electrostatically charged before being delivered through the gas delivery tubes 122, 126.

Figure 11B:
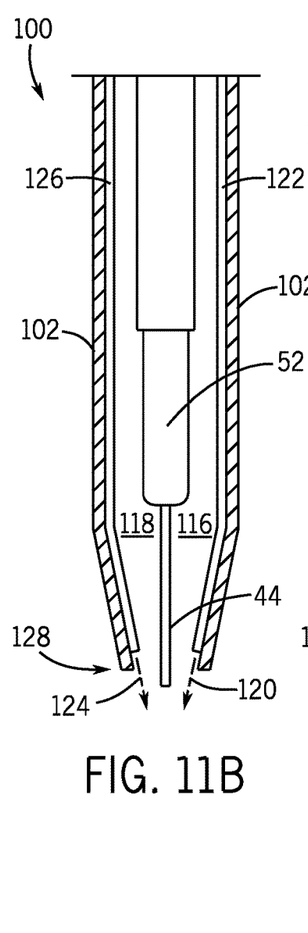
FIG. 11B is a side view of the contact element and the lower portion of the nozzle having gas delivery tubes disposed between wall sections of the nozzle and the contact element and adjacent the wall sections in accordance with aspects of the present techniques.

It will be appreciated that, in certain embodiments, the lengths of the first and second gas delivery tubes 122, 126 may be different than illustrated in FIG. 11A. For example, as illustrated in FIG. 11B, in certain embodiments, the gas delivery tubes 122, 126 may extend through the interior of the nozzle 100 such that the flows of gas 102, 124 are delivered proximate to a distal end 128 of the nozzle 100. Furthermore, in certain embodiments, the gas delivery tubes 122, 126 may be attached to an interior wall of the respective wall sections 102.

Figure 11C:
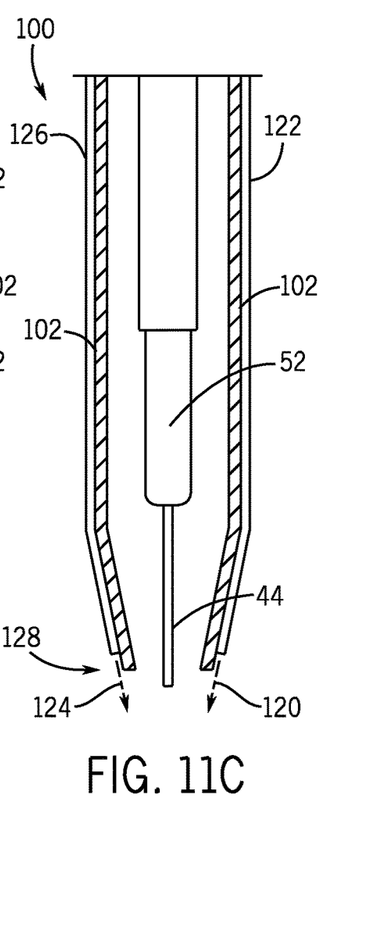
FIG. 11C is a side view of the contact element and the lower portion of the nozzle having gas delivery tubes disposed on a side of the wall sections of the nozzle opposite the contact element in accordance with aspects of the present techniques.

Furthermore, in certain embodiments, the gas delivery tubes 122, 126 may not be disposed internal to the nozzle 100, but rather external to the nozzle 100. For example, as illustrated in FIG. 11C, in certain embodiments, the gas delivery tubes 122, 126 may be attached to an exterior wall of the respective wall sections 102. However, in other embodiments, instead of being directly attached to the nozzle 100, the gas delivery tubes 122, 126 may instead extend at some distance from the nozzle 100 while still delivering the respective flows of gas 120, 124 relatively proximate the distal end 128 of the nozzle 100.

Figures 12, 13:
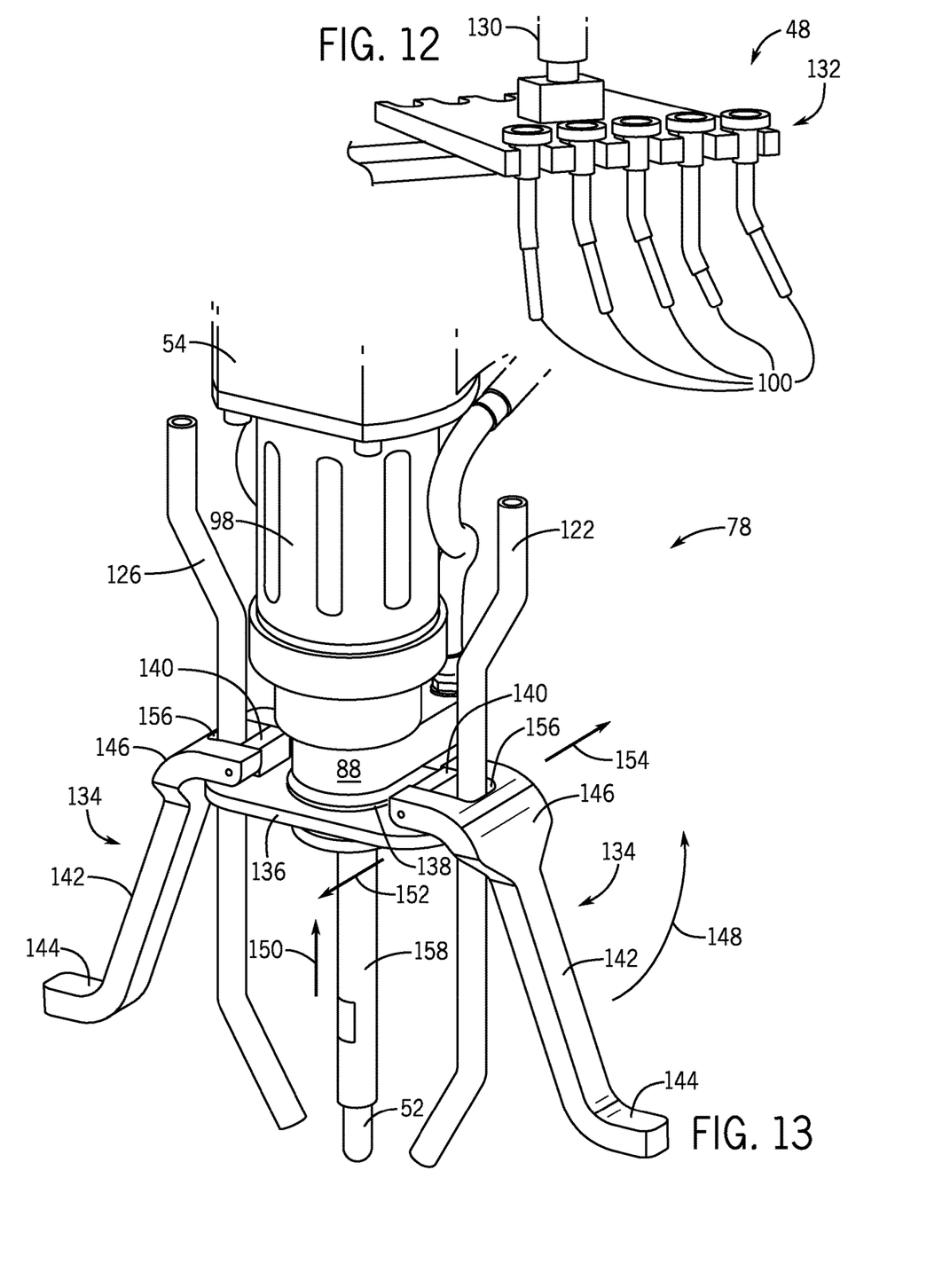
FIG. 12 illustrates a nozzle changing system in accordance with aspects of the present techniques.
FIG. 13 is a perspective view of another embodiment of the welding torch assembly having upwardly pivoting shields in accordance with aspects of the present techniques.

As described above, as welding is performed to fill the narrow groove 50 between the workpieces 14, the nozzle 100 may be gradually retracted from the groove 50 as the progressing weld moves upward between the workpieces 14. It will be appreciated that due at least in part to the changing depth as the welds are stacked on top of each other, the operational parameters of the contact element 52, the nozzle 100, and the welding torch assembly 78 as a whole may change. As such, to facilitate these changing operational parameters, the nozzle changing system 48 described above with respect to FIG. 1 may be used to change one nozzle 100 of the welding torch assembly 78 with another nozzle 100. FIG. 12 illustrates an exemplary nozzle changing system 48. In certain embodiments, the nozzle changing system 48 includes a robot 130 that, for example, may have an arm that is used to retrieve the nozzle 100 currently being used by the welding torch assembly 78, place this nozzle 100 into a rack 132 that holds a plurality of nozzles 100, take a replacement nozzle 100 from the rack 132, and then install the replacement nozzle 100 into the welding torch assembly 78. For example, a first nozzle 100 may be used for the root pass (e.g., first layer) of the weld, a second nozzle 100 may be used for subsequent passes of the weld to a certain point along the depth of the workpieces 14, and a third nozzle 100 may be used for the remaining passes of the weld.

FIG. 13 is a perspective view of another embodiment of the welding torch assembly 78. In the illustrated embodiment, the nozzle 100 described above with respect to FIGS. 8 through 11 has been replaced with a set of shields 134 disposed on opposite sides of the contact element 52. In particular, in certain embodiments, a generally rectangular plate 136 is disposed about a collar 138 attached to a bottom portion of the welding torch body 88, and the plate 136 includes pivots joints 140 on opposite sides of the plate 136. As illustrated in FIG. 13, in certain embodiments, each of the shields 134 includes an arm 142 having a curved first end 144 and a larger curved second end 146, wherein the second end 146 of each arm 142 is configured to couple to the respective pivot joint 140 such that the arm 142 may pivot upward (e.g., away from the contact element 52) with respect to the welding torch assembly 78.

As illustrated in FIG. 13, the shields 134 are in fully extended position, which would be an initial operating position when welding within the narrow groove 50 begins. However, as the welding progresses, the shields 134 may gradually be retracted upward, as illustrated by arrow 148. In essence, the shields 134 function in the same manner as the opposing wall sections 102 of the nozzle 100 described above insofar as the shields 134 block the welding operation that is progressing in the narrow groove 50 from air being drawn into the weld area. However, in the embodiment described above with respect to FIGS. 8 through 11, the nozzle 100 is generally retractable in unison with the contact element 52. In contrast, in the embodiment illustrated in FIG. 13, the shields 134 are retractable separate from the retraction of the contact element 52. As illustrated by arrows 152 and 154 in FIG. 13, the shields 134 may also be rotated slightly via slight rotation of the collar 138 and the plate 136, enabling slight lateral movement of the shields 134, thereby facilitating robotic welding.

As also illustrated in FIG. 13, the gas delivery tubes 122, 126 may also be extractable as illustrated by arrow 150, but still capable of delivering gas proximate the progressing weld. In particular, as illustrated, in certain embodiments, the gas delivery tubes 122, 126 may extend through apertures 156 within the second ends 146 of the arms 142 of the shields 134. The apertures are designed such that the gas delivery tubes 122, 126 may be extracted through the apertures 156 independent of the upward rotation of the shields 134.

Figure 14:
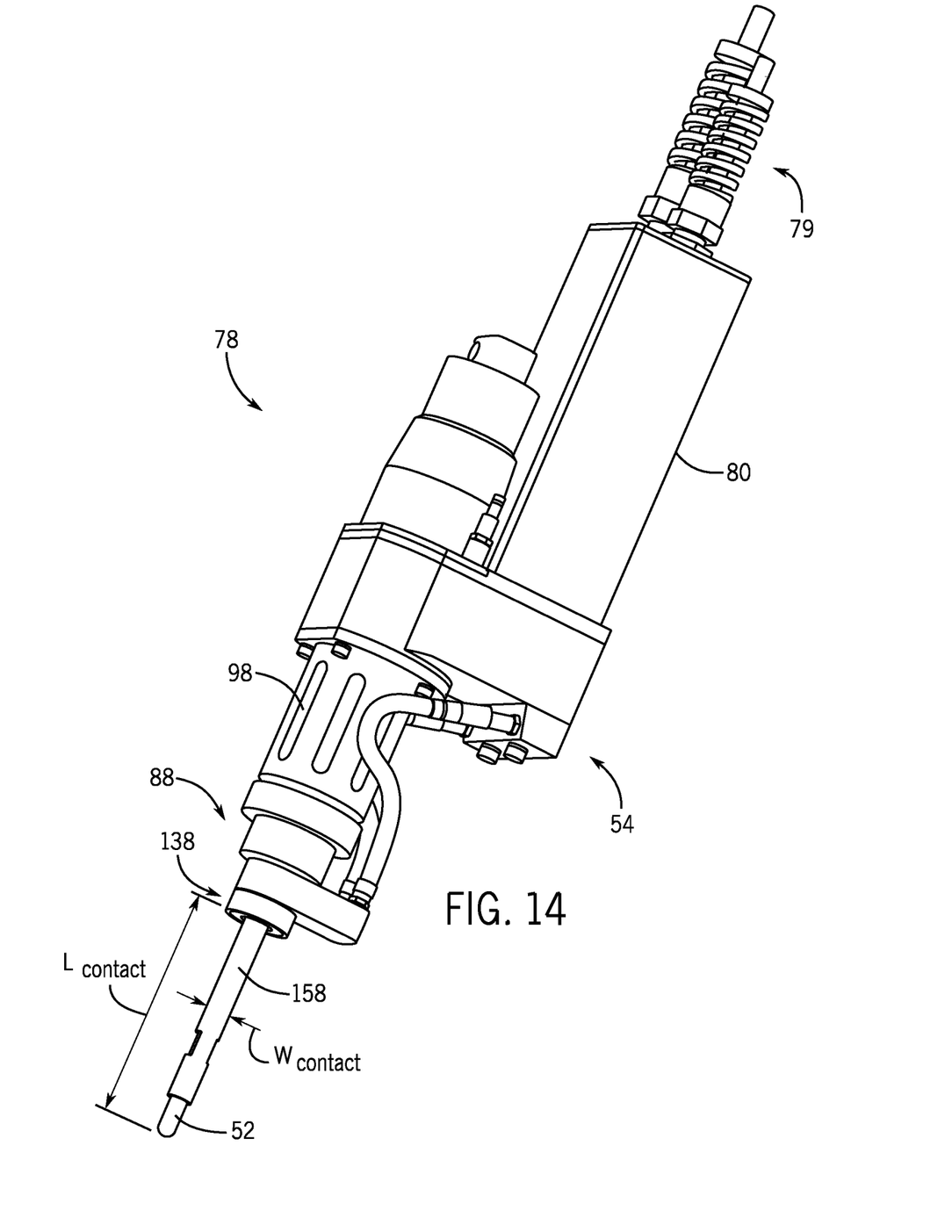
FIG. 14 is a perspective view of the welding torch assembly of FIG. 13 with a plate, shields, and gas delivery tubes removed for illustration purposes.

FIG. 14 is a perspective view of the welding torch assembly 78 of FIG. 13 with the plate 136, shields 134, and gas delivery tubes 122, 126 removed for illustration purposes. As illustrated, in certain embodiments, the contact element 52 may have an ultra-high temperature insulation sleeve 158 disposed around the radial periphery of the contact element 52. The insulation sleeve 158 generally protects the contact element 52 from the high temperatures experienced during welding, and also protects the contact element 52 from unintentional contact with the workpieces 14 during welding and, in certain embodiments, may be made of a non-conductive material. In certain embodiments, the insulation sleeves 158 may be made of a ceramic material or a fiberglass material. In certain embodiments, instead of using an insulation sleeve 158, the contact element 52 may be coated with an insulation coating instead of a sleeve.

In certain embodiments, the oscillation of the contact element 52 and, thus, the welding wire electrode 44 may be controlled by the control circuitry 28 described with respect to FIG. 1. For example, the frequency and shape of the oscillation (e.g., as illustrated in FIGS. 4-6), including both the oscillation pattern or "geometry" as well as the size of the oscillation pattern, may be varied based on the depth of the progressing weld, the width between the workpieces 14, the wire feed speed, the travel speed of the contact element 52 in the direction of the progressing weld (e.g., the direction generally parallel to the walls of the workpieces 14), the location of the contact element 52 and/or the welding wire electrode 44 within the groove 50 both in the direction of the progressing weld and in the lateral direction with respect to the progressing weld (e.g., the direction generally perpendicular to the walls of the workpieces 14), and so forth.

Additional operating parameters which affect these adjustments may include such factors as the materials of the workpieces 14, the type and size of wire electrode 44, the voltage and/or current supplied by the power supply 16, and so forth. Any and all of these operational parameters may be adjusted by the control circuitry 28 based on the other operational parameters. As a non-limiting example, the frequency and/or shape of the oscillation of the welding wire electrode 44 may be different when the welding wire electrode 44 is near one of the walls of one of the workpieces 14 than when the wire electrode 44 is near the middle of the groove 50. The operational parameters listed above may be sensed by sensors positioned throughout the system 10 or may be known by the system 10 in the case of robotic welding.

It should be noted that when parameters are adjusted, these parameters are generally controlled by the appropriate system component involved. For example, changes in weld power are adjusted by the power supply 16. Changes in wire feed speed are made by the wire feeder 22. Changes in gas flow rates may be made by the valving 32 in the power supply 16 or other similar components of the wire feeder 22. Changes in travel speed, in automated applications, are adjusted by the robot that moves the welding torch 24. Changes in spin geometry are implemented by the motion control assembly 54 that moves the welding wire electrode 44. Those skilled in the art will readily appreciate that these devices may be designed to implement the altered parameters during the welding operation.

As such, the control circuitry 28 (and/or the control circuitry 34 and/or the motion control assembly 54) may control any of the parameters described herein based at least in part on a position of the wire electrode 44 (and/or contact element 52) within the weld groove 50. For example, the parameters may be controlled by the control circuitry 28 based at least in part on a position of the wire electrode 44 (and/or contact element 52) at a depth within the weld groove 50 (e.g., as along depth d illustrated in FIG. 3B), along a length of the weld groove 50 (e.g., as along a length of the workpieces 14 into the page in FIG. 3B), at any of the radial positions along the patterns 68, 70, 76 illustrated in FIGS. 4, 5, and 6, among other patterns, and any other positions of the wire electrode 44 (and/or contact element 52) with respect to the weld groove 50. One example of the type of parameter that may be controlled by the control circuitry 28 based on a position of the wire electrode 44 (and/or contact element 52) may be the geometry of the desired pattern (e.g., a size of the desired pattern, a shape of the desired pattern, a frequency of cyclical motion, and so forth) of the wire electrode 44. Other parameters that may be controlled by the control circuitry 28 based on a position of the wire electrode 44 (and/or contact element 52) may be wire feed speed of the wire electrode 44, travel speed of the wire electrode 44, contact element 52, nozzle 100, welding torch 24, and/or welding torch assembly 78, direction of travel (e.g., along subsequent passes, around corners, and so forth) of the wire electrode 44, contact element 52, nozzle 100, welding torch 24, and/or welding torch assembly 78, parameters of weld power (e.g., current, voltage, polarity, and so forth) applied to the wire electrode 44, parameters of gas flow (e.g., gas flow rates, type of gases used, mixtures of gases used, and so forth), configurations of the weld groove 50 (e.g., depth, narrowness, and so forth). It will be appreciated that the control circuitry 28 for effectuating the control described herein may include hardware elements (including certain types of circuitry), software elements (including computer code stored on a non-transitory computer-readable medium), or a combination of both hardware and software elements.

In addition to the foregoing examples, it has been found that the use of DCEN welding procedures with the welding wire discussed above, with mechanical movement of the arc, may provide particularly good results, and may be even more attractive on certain types of workpieces 14. For example, the Metalloy® X-Cel™ wire mentioned above is particularly well suited to reduce spatter, while enhancing weld metal wetting (avoiding overly "crowned" beads). The use of a DCEN process, moreover, with arc movement and in combination with such wires, reduces overheating.

It is currently believed that welding wires suitable for these applications (corresponding generally to the X-Cel™ wire mentioned) are characterized by components that stabilize the arc (producing stable arcs with reduced spatter). For example, such stabilizers may include potassium and compounds that contribute potassium during the welding process (such as potassium feldspar, potassium titanate, potassium manganite-titanate, potassium sulfate, potassium carbonate, potassium phosphate, potassium molybdate, potassium nitrate, potassium fluosilicate, and complex oxide compounds containing potassium). Moreover, graphitic and non-graphitic carbon sources may provide stabilization by sublimating into the arc column and by rendering finer droplet metal transfer. Possible modification of existing welding wires (such as those mentioned) could include potassium from any other or more sources noted above, and a suitable carbon source, such as graphite or carbon containing iron and/or alloy powders.

Regarding the particular DCEN processes involved, these will typically be performed at currents and voltages selected based at least in part on the electrode diameter, the electrode extension (e.g., contact tip to plate), the welding position, the workpiece or base plate type and diameter, the travel speed and deposition rates, the wire feed speed, and so forth. For example, voltages ranging from 21 to 30 Volts may be suitable, with currents ranging from 150 to 450 Amps. Moreover, regarding shielding gases, appropriate gas mixes are believed to include argon and carbon dioxide, with a minimum of 75% and a maximum of 95% argon (although other amounts and combinations may be satisfactory, such as 98% argon, 2% oxygen). Still further, it is contemplated that the DCEN polarity selected may include non-pulsed and pulsed current.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
a welding torch assembly configured to establish a welding arc between an electrode and workpieces separated by a narrow groove utilizing power from a power supply, the welding torch assembly comprising:
a motion control assembly configured to actuate a contact element through which the electrode is fed to move the electrode radially in a desired pattern during welding within the narrow groove;
a nozzle through which the electrode is fed and within which the electrode is radially moved by the motion control assembly via the contact element, wherein the motion control assembly is configured to move the electrode radially with respect to the nozzle;
a welding torch body that comprises the nozzle;
a first gas delivery tube configured to delivering shielding gas proximate the welding arc via the nozzle; and
a trolley assembly configured to align the welding torch assembly within the narrow groove during welding within the narrow groove, the trolley assembly comprising a trolley that comprises:
a plurality of wheels arranged to interface with top surfaces of workpieces separated by the narrow groove, to facilitate aligning and movement of the nozzle along the narrow groove; and
an aperture through which the welding torch body is insertable and retractable during welding, to facilitate insertion and extraction of the nozzle into and out of the narrow groove.

2. The system of claim 1, wherein the nozzle comprises two separate wall sections disposed on opposite sides of the nozzle and out of contact with the electrode.

3. The system of claim 1, wherein the nozzle comprises a forward wall section, an aft wall section, a first side wall section connecting a first end of the forward wall section to a first end of the aft wall section, and a second side wall section connecting a second end of the forward wall section to a second end of the aft wall section.

4. The system of claim 3, wherein the forward wall section and the aft wall section are both generally arcuate, and the first and second side wall sections are both generally straight and parallel to each other.

5. The system of claim 1, wherein the nozzle is retractable with respect to the welding torch assembly.

6. The system of claim 2, wherein the welding torch assembly comprises a plurality of gas delivery tubes, including the first gas delivery tube, configured to deliver shielding gas proximate the welding arc.

7. The system of claim 6, wherein the first gas delivery tube is configured to deliver shielding gas to the welding arc via a forward cavity between the electrode and a forward wall section of the nozzle, and further comprising a second gas delivery tube configured to deliver the shielding gas to the welding arc via an aft cavity between the electrode and an aft wall section of the nozzle.

8. The system of claim 6, wherein the plurality of gas delivery tubes are each disposed on a side of the wall sections of the nozzle opposite the electrode.

9. The system of claim 1, comprising an insulative material disposed on an exterior of the contact element.

10. The system of claim 1, comprising a nozzle changing station having a plurality of substitute nozzles, wherein the welding torch assembly is configured to substitute the nozzle with one of the substitute nozzles.

11. A system comprising:
   a welding torch assembly configured to establish a welding arc between an electrode and workpieces separated by a narrow groove utilizing power from a power supply, the welding torch assembly comprising:
      a motion control assembly configured to actuate a contact element through which the electrode is fed to move the electrode radially in a desired pattern during welding within the narrow groove;
      two separate shielding arms disposed on opposite sides of the electrode and out of electrical contact with the electrode, the motion control assembly configured to move the electrode radially with respect to the shielding arms; and
      a trolley assembly configured to align the welding torch assembly within the narrow groove during welding within the narrow groove, the trolley assembly comprising a trolley that comprises:
         a plurality of wheels arranged to interface with top surfaces of workpieces separated by the narrow groove, to facilitate aligning and moving of at least one component of the welding torch assembly along the narrow groove during the welding; and
         an aperture through which at least part of the at least one component of the welding torch assembly is insertable and retractable during the welding;
         wherein the at least one component of the welding torch assembly applies the welding within the narrow groove.

12. The system of claim 11, wherein the shielding arms are configured to pivot upward away from the contact element.

13. The system of claim 11, comprising an insulative material disposed on an exterior of the contact element.

14. The system of claim 11, wherein the contact element is retractable with respect to the narrow groove.

15. The system of claim 11, wherein the welding torch assembly comprises a plurality of gas delivery tubes for delivering shielding gas proximate the welding arc.

16. The system of claim 15, wherein the plurality of gas delivery tubes comprises a first gas delivery tube for delivering shielding gas between the electrode and a forward shielding arm, and a second gas delivery tube for delivering shielding gas between the electrode and an aft shielding arm.

17. The system of claim 2, wherein the two separate wall sections are configured to reduce a flow of shielding gas away from the welding arc within the narrow groove.

18. The system of claim 11, wherein the shielding arms are configured to reduce a flow of shielding gas away from the welding arc within the narrow groove.

19. The system of claim 18, wherein the welding torch assembly comprises a gas delivery tube configured to deliver the shielding gas proximate the welding arc from a location between the shielding arms.

\* \* \* \* \*